United States Patent
Wecker (10) Patent No.: US 7,117,535 B1
(45) Date of Patent: Oct. 3, 2006

(54) SOFTWARE-GENERATED MACHINE IDENTIFIER

(75) Inventor: David Brian Wecker, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 971 days.

(21) Appl. No.: 10/022,225

(22) Filed: Dec. 14, 2001

(51) Int. Cl.
*G06F 17/30* (2006.01)
*H04L 9/32* (2006.01)

(52) U.S. Cl. .................. 726/29; 726/26; 707/104.1; 707/205

(58) Field of Classification Search ............... None
See application file for complete search history.

(56) References Cited

U.S. PATENT DOCUMENTS

| | | | |
|---|---|---|---|
| 5,509,070 A | | 4/1996 | Schull |
| 5,680,573 A | * | 10/1997 | Rubin et al. .............. 711/129 |
| 5,892,899 A | * | 4/1999 | Aucsmith et al. ........... 726/27 |
| 5,892,900 A | | 4/1999 | Ginter et al. |
| 5,978,791 A | * | 11/1999 | Farber et al. .................. 707/2 |
| 6,061,449 A | * | 5/2000 | Candelore et al. ........... 380/28 |
| 6,247,131 B1 | * | 6/2001 | Kotani et al. ................ 726/26 |
| 6,253,226 B1 | * | 6/2001 | Chidambaran et al. ..... 718/104 |
| 6,640,304 B1 | * | 10/2003 | Ginter et al. ............... 713/193 |
| 6,847,948 B1 | * | 1/2005 | Paolini et al. ................ 705/56 |
| 2002/0111997 A1 | * | 8/2002 | Herlihy ........................ 709/203 |

OTHER PUBLICATIONS

S. K. Cha et al. paper entitled Object-Oriented Design of Main-Memory DBMS for Real-Time Application, 1995 http://citeseer.ist.psu.edu/cha95objectoriented.html.*

"White paper: Main Memory vs. RAM-Disk Databases: A Linux-based Benchmark", Dec. 5, 2001) http://www.linuxdevices.com/news/NS6762612582.html http://216.109.125.130/search/cache?p=File+ID+based+on+random+memory+object&prssweb=Search&ei=UTF-8&fl=0&u=www.mcobject.com/memorybenchmark.pdf&w=file+id+based+random+memory+object&d=GeYEIWFULZfr&icp=1&.intl=us.*

Mayford B. Roark et al. STC 96 Embedded Real-Time and Database: How Do They Fit Together? Thursday, Apr. 25, 1996 http://citeseer.ist.psu.edu/roark96embedded.html.*

John Saldanha "A File System for Mobile Computing" Dec. 1993 Technical Report 93-1 http://citeseer.ist.psu.edu/118829.html.*

Tehnical Note TN1103 "Uniquely Indentifying a Mac OS Computer" developer.apple.com/technotes/tn/tn1103.html Updated: [Feb. 9, 1998].*

* cited by examiner

*Primary Examiner*—Gilberto Barrón, Jr.
*Assistant Examiner*—Virgil Herring
(74) *Attorney, Agent, or Firm*—Woodcock Washburn LLP (57) ABSTRACT

A technique for creating a tamper-resistant machine identifier is disclosed. A file is created with a set of file blocks having random locations. Each block is identified by an object identifier that represents the block's location. A machine identifier is created based on the object identifiers of the file blocks. Machine-identifier-dependent software (i.e., software that is designed to perform its function only in the presence of a particular machine identifier) is created and loaded into the file. The software has the machine identifier embedded within itself, and checks the object identifiers of the file in which it is stored against the embedded machine identifier prior to performing its functions. The software may, in one example, be rights-management software that is adapted to allow commercially valuable content to be rendered only on a particular device having a particular machine identifier.

13 Claims, 4 Drawing Sheets

SOFTWARE-GENERATED MACHINE IDENTIFIER

FIELD OF THE INVENTION

This invention relates to the field of computing devices, and in particular to the creation of a tamper-resistant machine identification code.

BACKGROUND OF THE INVENTION

In many computing applications, it is often necessary or desirable to use a code that uniquely identifies a device. For example, in Digital Rights Management (DRM) systems, which enforce rights to content (e.g., audio, video, text, software, etc.), the rights are typically tied to a particular device (i.e., the content is usable only on a particular device), in which case it is necessary or convenient to identify the device by a unique (or substantially unique) identification code.

In cases where a device is manufactured for this purpose, many hardware techniques exist for ensuring that the device is identifiable by a unique, unalterable machine identification (MID). For example, an MID is usually placed in hardware in a tamper-resistant way (such as by burning the MID into the device's processor or into a built-in ROM, non-erasably encoding the MID on a built-in disk, using a smart card dongle, or using permanent electronic serial numbers encoded on the device's components, etc.).

Many devices, however, do not have a built-in unique MID, or hardware from which one can be derived. For example, most handheld computers (e.g., PocketPC computers, Palm computers, etc.) are built from identical hardware that has no built-in unique identifiers. In such cases, it may be necessary to uniquely identify such a device, even if the device does not have any built-in unique identifiers.

Most software approaches to creating an MID yield an MID that can be altered, duplicated or set by a device's user, making these MIDs untenable for security use. An MID that can be changed without detection invites "spoofing" of the device that the MID is supposed to identify, thus allowing an interloper to obtain access to data or use of software that is supposed to be restricted to one device having a particular MID. Conventional software-based MIDs typically have the drawback that the software that creates them generally duplicates the same MID if the software is simply run again on the same machine or on a different machine, allowing anyone who obtains the software to spoof the MID. Other deficiencies in software-created MIDs are their inability to survive a warm-boot (i.e., where the operating system (O/S) is restarted, but user data is not erased), and lack of techniques for using an MID in a manner that allows a change in the MID by a nefarious user to be detected.

The present invention overcomes the drawbacks of the prior art.

SUMMARY OF THE INVENTION

A system and method for generating a tamper-resistant machine identifier (MID) is disclosed. An MID generated by the invention is persistent across a warm-boot, is pseudo-random in nature and may be queried by user software, but can not be successfully set or changed by user software.

An exemplary computing device has a file system that assigns a unique number (called an object identifier) to every "object"—e.g., a file block, a database record, or a registry entry, etc. When such an object is created, the memory location(s) allocated for the object become unavailable. Each object has an "object identifier" that describes (or equals) its starting memory location. When an object is deleted, the object identifier associated with the deleted file, database record or registry entry is placed on a list of available object identifiers. After sufficient time has passed following a cold boot (and, presumably, sufficient file system activity has occurred) to allow some randomness in the objects that have been allocated and de-allocated, a dummy database is created with a number of empty records. A random number generator is used to randomly delete and optionally create records in the dummy database. As time passes and records are allocated and de-allocated, the randomness of the list of available object locations increases. In a typical implementation of the file system, memory is "recycled" by fulfilling memory requests from the list of previously-de-allocated memory locations.

After sufficient time has passed, a file with a specified number of blocks is created. The object identifiers of the blocks are concatenated together to create an MID. The created file is filled with a program (an "MID-dependent program") whose usage is to be tied to the MID. The program is specially created for a particular MID, and the MID is embedded within the program. The program includes code that checks to see if the MID embedded within it matches the object identifiers of the blocks of the file in which it is located. If the MID-dependent program determines that the OIDs of the blocks of its own file do not match the expected MID, then authentication fails because the failure to match indicates either that the MID has been tampered with, that the program has been ported to a machine on which it is not authorized, or that the MID has been regenerated without also generating a new program that embeds the new MID. The randomness involved in the process of allocating blocks for the file that stores the program makes it unlikely that a new MID generation process would result in allocating another file for the program having exactly the same object identifiers.

A software-generated MID in accordance with the invention survives a warm boot, so long as the warm boot does not result in the removal of the file containing the MID-dependent program. A software-generated MID does not survive a cold boot. If a new MID is generated, the new MID will likely fail to match any previously generated MID.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Overview

By using an innate aspect of an Operating System (O/S) such as the in-memory Windows-CE operating system, an MID can be created that is unique and tamper-proof. The software creating the MID does not deterministically control the final value for the MID because the MID is dependant on a relatively random pre-existing O/S state. MID-dependent software is created based on this state, and the unlikelihood of re-creating this relatively random state makes it unlikely that the MID-dependent software can be ported to another device on which its use is not authorized.

Exemplary Computing Environment

Figure 1:
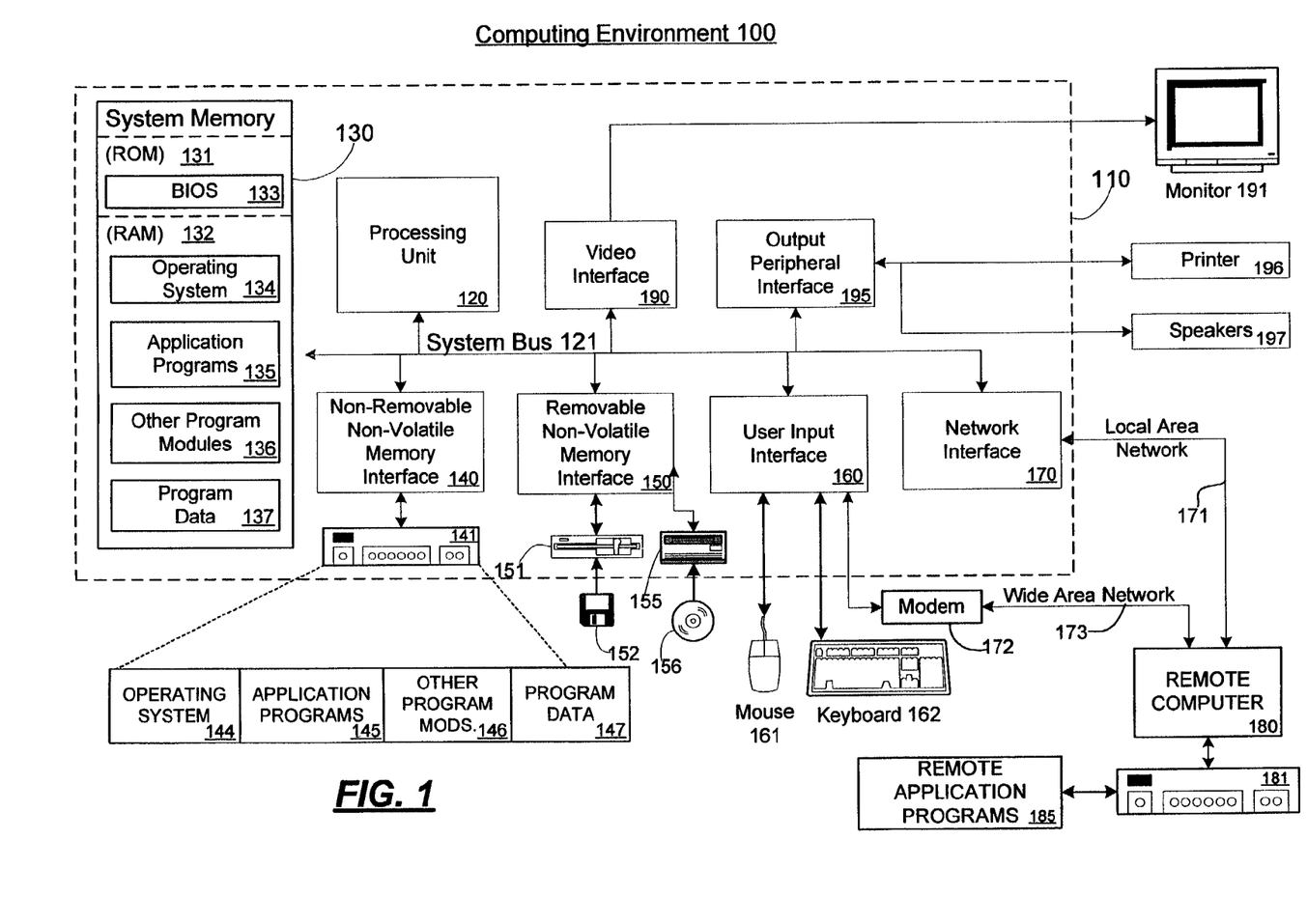
FIG. 1 is a block diagram of an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Software System and Method for Creating a Unique Machine Identification (MID)

Figure 2:
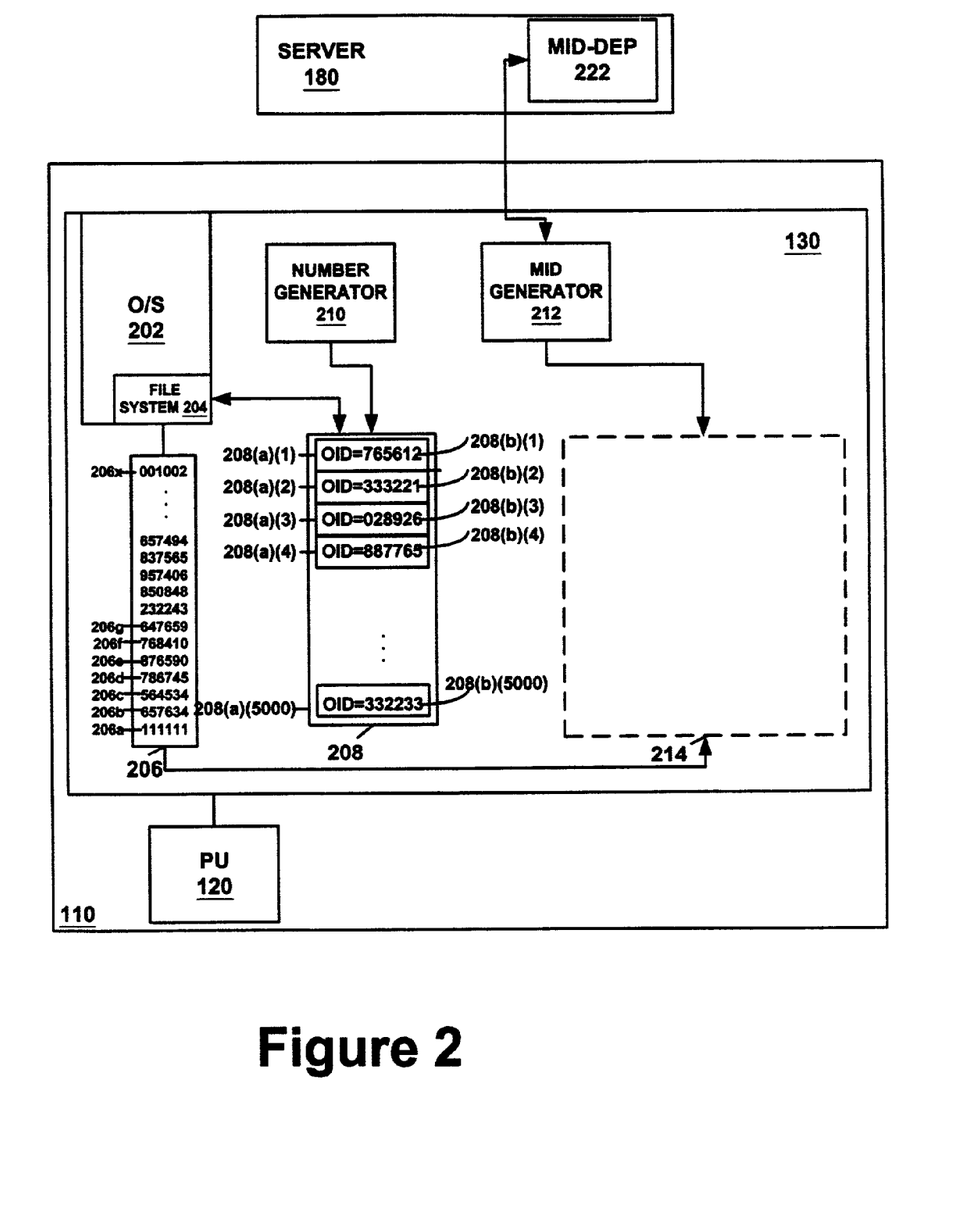
FIG. 2 is a block diagram of a system for creating a tamper-resistant MID in accordance with one embodiment of the invention.

FIG. 2 illustrates an exemplary system for creating a unique MID. In one embodiment of the invention, computer 110 is communicatively coupled to a remote computer 180. Computer 180 in this embodiment of the invention is a server from which may be downloaded MID-dependent software 222 that performs a device-dependent function, such as restricting data to use on a particular computing device 110. For example, the data may be an encrypted electronic book having a commercial value, and MID-dependent software 222 may enforce the rule that the electronic book can only be decrypted and viewed on a particular device or set of devices.

Computer 110 comprises a memory 130 and processing unit 120. Memory 130 may include an operating system 202, an available object identification file 206, a database 208, a random number generator 210, an MID generator 212, and a file 214 which, as described below, receives and stores MID-dependent software 222. In one embodiment of the invention, computer 110 is a handheld computer such as a Pocket PC device.

In one embodiment of the invention, operating system 202 is the WINDOWS-CE operating system distributed by Microsoft Corporation of Redmond, Wash., although any suitable operating system may be used.

File system 204 is a component of operating system 202. File system 204 manages the storage of objects such as files, database records, and registry entries by assigning one or more memory blocks to each such entry. File system 204 assigns an object identifier (OID) to each stored object—i.e., each block of a file, to each database record, and to each registry entry. In a preferred embodiment, an OID is a physical memory address, representing the location in memory of the beginning of the file block, database record, or registry entry at which the object having a given OID is stored. An MID in accordance with the invention may be derived from the OID values assigned to certain blocks in the manner described below. OID values are suitable for use as MID components because OID values are persistent across warm-boots, can be made relatively random, and can be queried by user software. Additionally, OIDs have the beneficial feature that if they are changed by user software, the operating system may crash due to the inability of the file system to correctly identify objects (necessitating a cold boot and the consequent generation of a new MID), thereby providing a measure of tamper-resistance to the MID.

File system 204 maintains, or has access to, a list 206 of available locations 206a, 206b, . . . 206x in memory 130 at which objects can be stored. A location in memory 130 is available if the location is not presently being used to store another object—i.e., if the memory location has not been used since the last cold boot, or if the memory location contains a de-allocated object whose location in memory 130 has been marked for re-use.

File system 204 also interacts with database 208. Database 208 stores and manages records 208(a)(1), 208(a)(2), . . . 208(a)(n). File system 204 provides database 208 with memory blocks in which to store records. The memory blocks provided by file system 204 each have an OID that identifies where the record is stored in memory, as discussed above. Thus, record 208(a)(1) is associated with OID 208(b)(1), record 208(a)(2) is associated with OID 208(b)(2), and so on.

Random number generator 210 generates numbers according to a pseudo-random algorithm; such algorithms are known in the art and therefore are not discussed herein. As discussed below, random number generator 210 may be used to delete random records from database 208, thereby freeing random memory locations for the storage of new objects. These random memory locations will have correspondingly random object IDs as their addresses. A technique is discussed below whereby these random object IDs can be used to generate an MID.

MID generator 212 is a software module that generates a unique MID for computer 110. In order to create an MID, MID-generator 212 generally creates a file 214 having a predetermined number of blocks, and creates an MID based on the OIDs of those blocks (e.g., by concatenating the OIDs). The creation of the file occurs after the list 206 of available memory locations has been sufficiently randomized by the process described below, so that file 214 comprises randomly located blocks. Because file 214 is created during the process described in FIG. 3, file 214 is outlined with a dashed line in FIG. 2. The nature of file 214 is described in detail below in connection with FIG. 4. An MID-dependent program 222 (received from server 180, as discussed below) may be stored in file 214 as described below. "MID-dependent program," in this context, means a program that is designed to perform its functions (e.g., the function of decrypting commercially-valuable encrypted content, in the example above) only in an environment identified by a particular MID.

Figure 3:
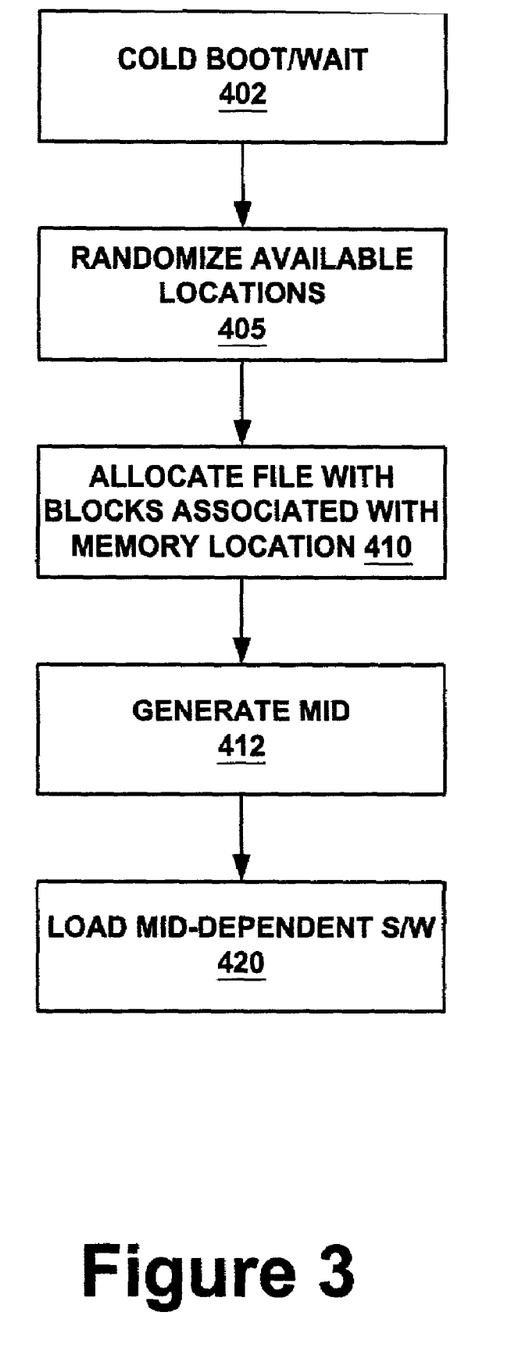
FIG. 3 is a flow diagram of a method for creating a tamper-resistant MID in accordance with one embodiment of the invention.

FIG. 3 is a flow diagram of a method for creating a tamper-resistant machine identification in accordance with one embodiment of the invention. Briefly, the process is as follows. Following startup, computer 110 randomizes the list of available memory locations. In one embodiment of the invention, the list is randomized by creating a large "dummy" database 208 (i.e., a database with empty records), where the records that make up database 208 are later deleted at random to create randomly-located blocks of free space. The purpose of creating this dummy database 208 is to cause file system 204 to allocate a large number of memory blocks, although other techniques that cause a large number of objects to be allocated may be used (e.g., creating a large number of small files, creating a large number of registry entries, etc.). Random number generator 210 is then used to randomly delete database records (or whatever types of objects have been allocated). This random deletion of records (or other objects) causes random memory blocks (identified by correspondingly random object IDs) to be placed on the list 206 of available memory blocks. Preferably, a sufficient period of time is allowed to pass before using random number generator 210 to delete records, since the passage of time allows computer 110 to perform enough unpredictable operations to randomly seed random number generator 210; it will be appreciated, however, that other techniques may be used to help generate random seed data for random number generator 210 (e.g., having the user provide input and using the unpredictable time intervals between input events).

After a list of random available memory blocks has been created a file 214 (shown in FIG. 2) of a specified size is created. The file is of the necessary size to store an MID-dependent program 222 (shown in FIG. 2). An MID is created based on the OIDs of the blocks that make up the file 214 (e.g., by concatenating the OIDs of those blocks.) The MID is then uploaded to server 180, which creates an instance of MID-dependent program 222 specially for the uploaded MID. MID-dependent program 222 may perform functions related to the protection of secure content—e.g., decrypting protected content whose use is to be limited to a single machine or set of machines—although any type of software may be tied to an MID whether or not it performs security-sensitive functions. The MID-dependent program 222 is downloaded to computer 110 and stored in file 214. (The MID-dependent software fits in file 214 because MID-dependent program 222 is of a predetermined size that is known at the time file 214 is created; while the exact content of program 222 may change based on the MID, in a preferred embodiment the size does not change.) MID-dependent program 222 has embedded within itself the MID of computer 110. The MID is preferably stored in an obfuscated manner that does not require the MID's explicit representation within MID-dependent program 222. MID-dependent program 222 is made "MID-dependent" by including code that checks the embedded MID against the object identifiers of the blocks of file 214 in which MID-dependent program 222 is stored. Preferably, MID-dependent program 222 will fail to fulfill its purpose (e.g., will fail to decrypt protected content and will shut down) if the embedded MID does not match (or is not otherwise consistent with) the OIDs of file 214's blocks. Thus, any attempt to move MID-dependent program 222 to a different file location or a different machine will likely cause verification of the MID to fail, since file blocks must be allocated by the operating system following a randomization procedure, and it is unlikely that file 214 would be recreated with blocks having the exact same OIDs as the ones used to create the MID that server 180 used to create a particular instance of program 222.

The process of creating a tamper-resistant MID begins at step 402 with a cold boot. Since the MID of the present invention is designed to survive a warm boot, MIDs are generally created after the machine is started cold—i.e., from "power off." Following the cold boot, in one embodiment the system waits for a period of time. The reason for the wait is that the following step (405), as described below, involves some randomization using a pseudo-random number generator 210. If the system waits for a period of time following the cold boot before performing pseudo-random processes, it is likely that random events, computations, movement of data, etc., will have occurred that will increase the randomness in the seeding of the random number generator 210, although it will be understood that other techniques (e.g., receiving user input and using the unpredictable time intervals between input events as random data) may be used to help randomize the seeding of random number generator 210. While the wait may occur for any amount of time (or not at all), it will be understood that the amount of time to wait represents a trade-off between the amount of randomness in the MID-generating process, and the amount of delay prior to generating an MID.

Figure 4:
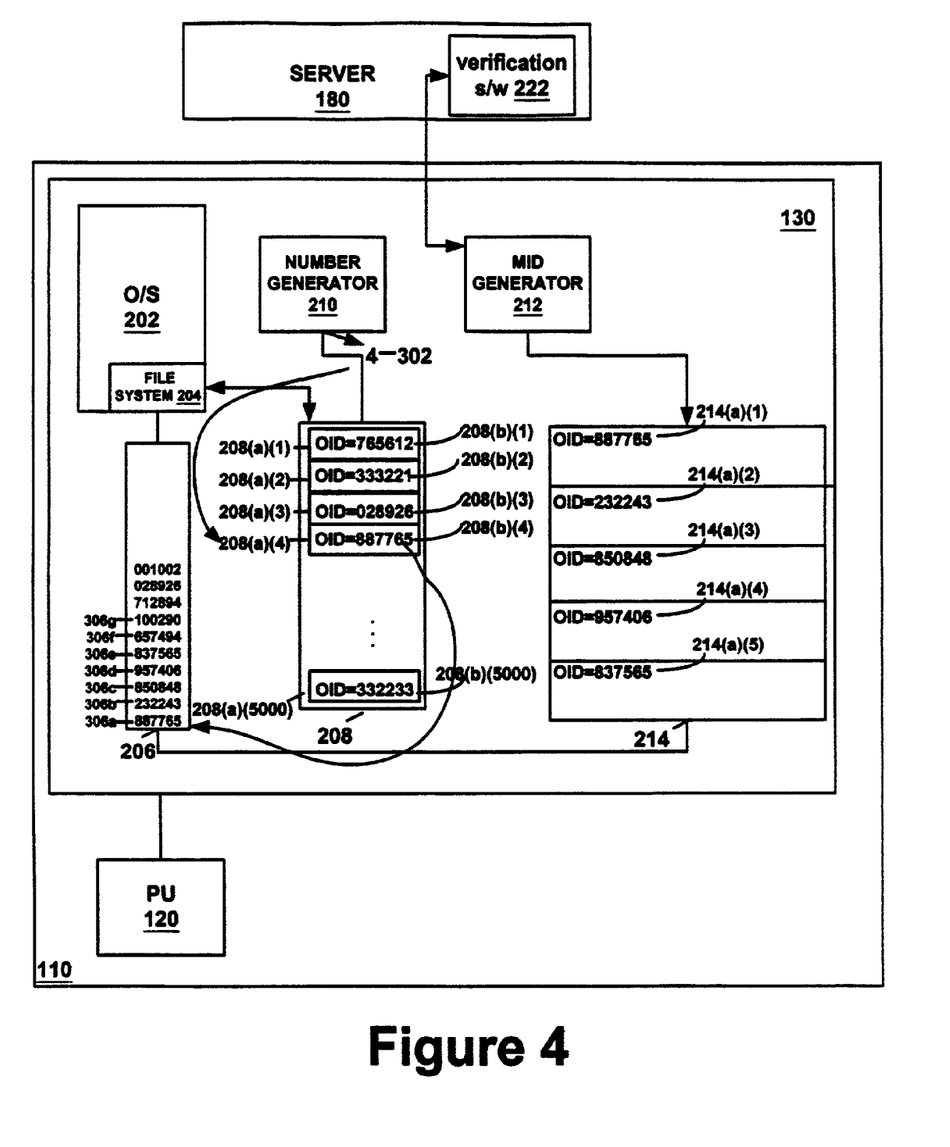
FIG. 4 is a block diagram illustrating the use of a random number generator to generate blocks with random object identifiers into which an MID-dependent program may be installed in accordance with one embodiment of the invention.

At step 405, a list of available memory locations is randomized. The goal of randomizing the set of available memory locations is to ensure that the file 214 that will later be created to hold MID-dependent software 222 will be located in a set of blocks having random object identifiers. One exemplary way of creating the list of random memory locations, as described above, is to create a dummy database 208 having many records (e.g., records 208(*a*)(1) through 208(*a*)(5000)), and to use random number generator 210 to randomly select records for deletion from that database. For example, if random number generator 210 selects the value "4" (reference numeral 302), the fourth record (reference numeral 208(*a*)(4)) in database 208 is deleted and the corresponding memory location 208(*b*)(4), (887765), is put on the list 206 of available memory locations, (reference numeral 306*a*), as shown in FIG. 4. The process may be repeated to select additional records of database 208 for deletion, thereby increasing the number of randomly-located memory locations that are available for allocation. The deleted records result in randomly scattered unallocated memory that can later be reallocated to file 214. It should be noted that the content of dummy database 208 is immaterial; the primary purpose for dummy database 208 is to randomize the set of available memory locations by deleting randomly located records from the database.

At step 410, file 214 (shown in FIG. 2) is allocated which will store the MID-dependent software 222 (also shown in FIG. 2). Typically, the size of the MID-dependent software is known at the time the file is created. Thus, if it is known for example that MID-dependent software 222 is five blocks in length, then file 214 may be created with five blocks. Alternatively, the file may be created with more blocks than are needed to house the MID-dependent software, so that, for example, a sufficient number of blocks are always allocated to generate an MID. These five blocks are allocated from the list 206 of available memory locations (e.g., from the end of the list). Exemplary file 214, (FIG. 4) in one embodiment of the invention, comprises five blocks, 214(a)(1), 214(a)(2), 214(a)(3), 214(a)(4), and 214(a)(5), which have memory locations (and corresponding OIDs) taken from the end of the list 206, (e.g. 306a, 306b, 306c, 306d, 306e respectively).

At step 412, a machine identifier (MID) is generated based on the OIDs of the blocks in file 214. The MID may be created by concatenating together exemplary OID values 306a, 306b, 306c, 306d and 306e, by hashing or digesting those values, or by any other technique that creates an MID based on the OID values of the blocks in file 214.

At step 420, file 214 is filled with MID-dependent software 222. In a preferred embodiment, the process of filling file 214 with MID-dependent software 222 comprises uploading the MID generated at step 412 to server 180, which creates a version of MID-dependent software 222 that has the uploaded MID embedded within it, and then downloading the created version of the MID-dependent software to computer 110 for insertion into file 214. The MID is embedded within MID-dependent software 222 in the sense that software 222 is able to verify that the MID of the machine on which it is running is the MID for which the version of software 222 was created (although the MID is preferably obfuscated within software 222 rather than directly represented within that software, so that it cannot easily be viewed by the user of computer 110). As noted above, one example of MID-dependent software is software that decrypts encrypted content only if the content and the MID-dependent software are located on a machine that has a particular MID, although there are other examples. One action typically performed by MID-dependent software 222 is to check, during its operation, that the MID of the device on which it is running is the one embedded within software 222, since any contrary conclusion suggests an unauthorized attempt to port software 222 to another machine, or an attempt to tamper with the MID. As one example, if the MID is a concatenation of the OID block numbers 214(a)(1), 214(a)(2) ... 214(a)(5) of file 214, then software 222 checks the embedded MID against the OID values of its own file block numbers concatenated together.

Suppose, for example, that a user (e.g., user 1) of computer 110 acquires MID-dependent software 222 from server 180 by uploading the MID of user 1's computer to server 180. Server 180 may return an MID-dependent program 222 that is associated with MID (e.g., MID="88776523224385084895740683 7565" to device 110. Verification program 222 may be associated with MID "8877652322438508489574068 37565" by appending the MID "8877652322438508489574068 37565" to the MID-dependent program 222, by encrypting MID-dependent program 222 using a key based on MID "8877652322438508489574068 37565", or by other known methods. MID-dependent program 222 is then loaded into file 214 as described above. Suppose that user 1 allows user 2 to copy MID-dependent program 222 on user 1's computer in an attempt to allow user 2 to access whatever data or service that MID-dependent program 222 provides access to. When MID-dependent software 222 is copied from computer 110 to user 2's computer (second computer), OID values from the second computer's available OID file will be assigned for the block numbers of the file into which MID-dependent program 222 is copied on the second computer. When the copy of MID-dependent program 222 on user 2's computer checks to see if the OIDs of the blocks in which user 2's copy of MID-dependent program 222 is stored match MID "88776523224385084895740683 7565", the verification process fails because block verification program 222 will not be located at the same location in memory on the second computer as it was in computer 110's memory, hence the MID the MID-dependent program 222 expects, "88776523224385084895740683 7565" will not match the OIDs in its own file and authentication fails.

Similarly, altering the file OIDs for the MID-dependent program 222 is likely to cause operating system 202 to crash, because the OIDs are typically memory addresses, and changing them results in the changed blocks being untraceable by the file system.

It will be noted that the MID and MID-dependent software 222 created according to the technique described above in connection with FIG. 4 has the following features:

The MID is based partly on random processes, so that running the same software two different times is unlikely to generate the same MID.

The MID is dependent on a feature of the state of the operating system (i.e., the location/OID) of certain file blocks, which makes it difficult for a user to change the MID without disrupting (and possibly crashing) the system.

The MID-dependent software is tightly bound to the location in which the MID is stored, since the MID is based on this location and the MID checks its own location against the MID prior to performing actions that should take place only on a device having a particular MID.

The MID survives a warm boot, so long as the warm boot preserves the location of objects in storage (or preserves any other state of the system on which the MID may be based).

If the system is cold-booted (i.e., booted from "power-off," or in a manner that clears storage locations), the randomness in the MID-generating process makes it highly unlikely that the same MID will be recreated.

The programming necessary to effectuate the processes performed in connection with the present invention is relatively straight-forward and should be apparent to the relevant programming public. Any particular programming language or methodologies may be employed to effectuate the present invention without departing from the spirit and scope thereof.

In the foregoing description, it can be seen that the present invention comprises a new and useful mechanism for creating a machine identification through software. It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

What is claimed is:

1. A method of generating a machine identifier comprising:

generating a database of records comprising object identifiers, each record having an associated memory block location;

randomly deleting records in the database, the memory locations of the deleted records becoming available for allocation;

allocating a file comprising memory blocks of the memory locations of the deleted records, each of the blocks having an object identifier based on the block's location in a memory; and creating a machine identifier based on the object identifiers of the deleted records associated with the allocated memory block locations.

2. The method of claim 1, further comprising:

transmitting said machine identifier to a remote computing device which creates a program based on said machine identifier; and receiving said program from said remote computing device and storing said program in said file, said program being adapted to check that the object identifiers of the memory blocks of which the file is comprised are consistent with said machine identifier.

3. The method of claim 2, wherein said program operates to decrypt encrypted content when said program is running on a device having a particular machine identifier, and wherein said program denies decryption of said encrypted content if the object identifiers of said memory blocks of which the file is comprised are inconsistent with said machine identifier.

4. The method of claim 2, wherein said machine identifier comprises a concatenation of the object identifiers of said memory blocks of which the file is comprised, wherein the machine identifier is embedded in the program, and wherein the program checks whether the machine identifier is consistent with the object identifiers by concatenating the object identifiers of the file in which the program is stored and comparing the concatenated object identifiers to the embedded machine identifier.

5. A computer-readable medium having stored thereon computer-readable instructions that:

allocate a file in memory, said file comprising at least a first block and a second block, said first block being associated with a first randomized value representing a first location in memory where said first block is located and said second block being associated with a second randomized value representing a second location in memory wherein said second block is located; and generate a machine identification based on said first value and said second value, wherein the first block and the second block comprise locations derived from a list of records randomly deleted from a database of object identifiers.

6. The computer-readable medium of claim 5, wherein said machine identification is generated by concatenating at least said first and second values.

7. The computer-readable medium of claim 5, having stored thereon further computer-readable instructions that receive a program from a remote computing device and store said program in said file, said program being adapted to check that said machine identification is consistent with the values associated with said first and second blocks.

8. The computer-readable medium of claim 5, having stored thereon further computer-readable instructions that randomize said list by adding and deleting records selected at random by a random number-generating module.

9. The computer-readable medium of claim 8, having stored thereon further computer-readable instructions that wait a specified period of time before allocating said file.

10. A system for generating a machine identification for a computing device comprising a file system that allocates storage blocks, each of the blocks having a block identifier that represents the location of a block in a memory of the computing device, the file system maintaining a list of unused locations in the memory that may be allocated for storage of information, the computing device having a database module that allocates memory in which to store database records, that de-allocates records upon request, and that places de-allocated records on the list whereby the de-allocated records may be reallocated for storage of information, the system comprising:

a database creation module that uses said database to allocate a number of dummy records;

a random number generator that selects dummy records to be deleted, wherein the selected records are deleted, and the locations of the deleted records added to the list of unused locations; and a machine identification generator that allocates a file comprising a plurality of blocks allocated from the list of unused locations in the memory and generates a machine identification based on the block identifiers for the blocks of which the file is comprised.

11. The system of claim 10, further comprising:

a software acquisition module that uploads the machine identification to a server which creates a program based on the machine identification and which stores the program in the file, the machine identification being embedded within the program, the program containing instructions which verify that the machine identification embedded within the program is consistent with the block identifiers of the blocks comprising the file in which the program is stored.

12. The system of claim 11, wherein the machine identification is embedded in the program in an obfuscated form.

13. The system of claim 10, wherein said machine identification generator generates the machine identification by concatenating the block identifiers for the blocks of which the file is comprised.

* * * * *